Jan. 1, 1929.

H. M. DOBBINS 1,697,636

DUPLEX MONORAIL

Filed Oct. 26, 1927

INVENTOR,
Horace M. Dobbins,
BY
F. E. Maynard,
ATTORNEY

Jan. 1, 1929.
H. M. DOBBINS
1,697,636
DUPLEX MONORAIL
Filed Oct. 26, 1927    3 Sheets-Sheet 2
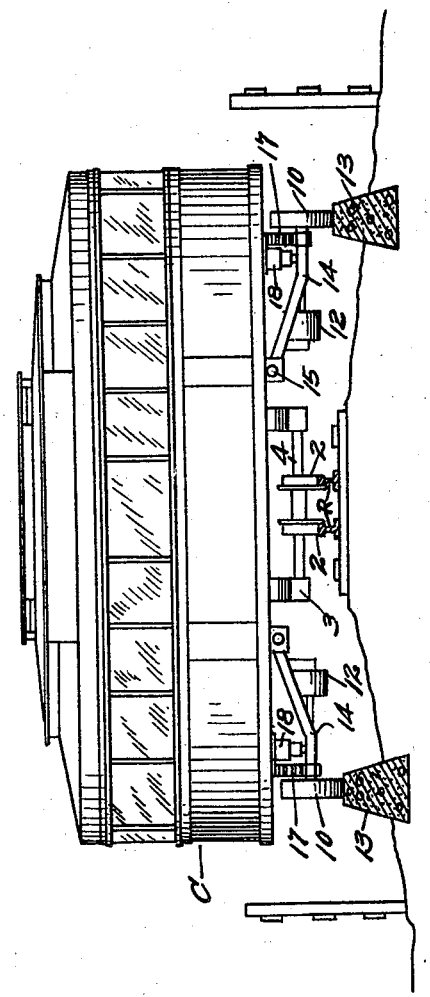
INVENTOR,
Horace M. Dobbins;
BY
F. E. Maynard, ATTORNEY.

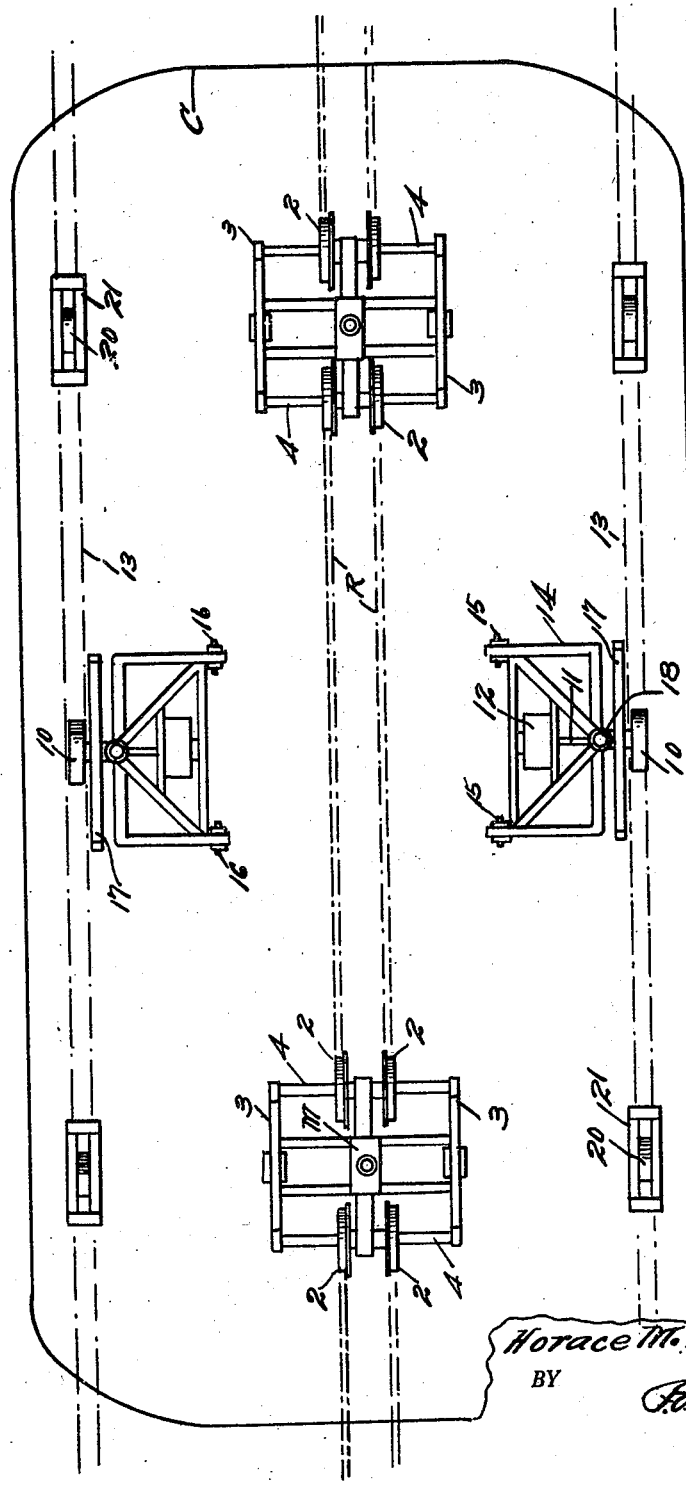

Patented Jan. 1, 1929.

1,697,636

UNITED STATES PATENT OFFICE.

HORACE M. DOBBINS, OF PASADENA, CALIFORNIA.

DUPLEX MONORAIL.

Application filed October 26, 1927. Serial No. 228,866.

This invention relates to railways and more especially to car and track combination, and to the undergear of the car.

The extremely low passenger load capacity of present day coaches as compared to the dead weight of the vehicle is well established and is recognized as a direct cause of low efficiency when figured on the passenger load and the car weight ratio.

When handling trains of heavy coaches with low passenger load the cost is serious and the advent of extensive automobile buss use has affected railway business very considerably and in many cases train service has been reduced and companies are establishing the more economical buss lines as a substitute.

My present invention has for an object to provide a new type of car giving a much increased passenger load efficiency at the cost of a comparatively small increase in the car weight.

An object is to provide a car of average length so as to readily negotiate curves and switches and of a very much increased width thereby obtaining the increased capacity.

Another object is to provide a car having an axial truck system operative on present, installed standard gage tracks or on an improved and lower cost duplex-monorail track beyond which the car overhangs considerably so as to take up nearly the whole of the usual width of the right-of-way surface; means being provided to maintain the balance of the car on its central trucks.

There are other objects, features and advantages of construction, combination and details of means which will be made manifest in the following specification of the herewith illustrative embodiment; it being understood that modifications, variations and adaptations may be resorted to within the spirit, scope and principle of the invention as it is more directly hereinafter claimed.

Figure 2 is an end view of the car.

Figure 3 is a plan of the under gear of the outlined car.

Figure 1:
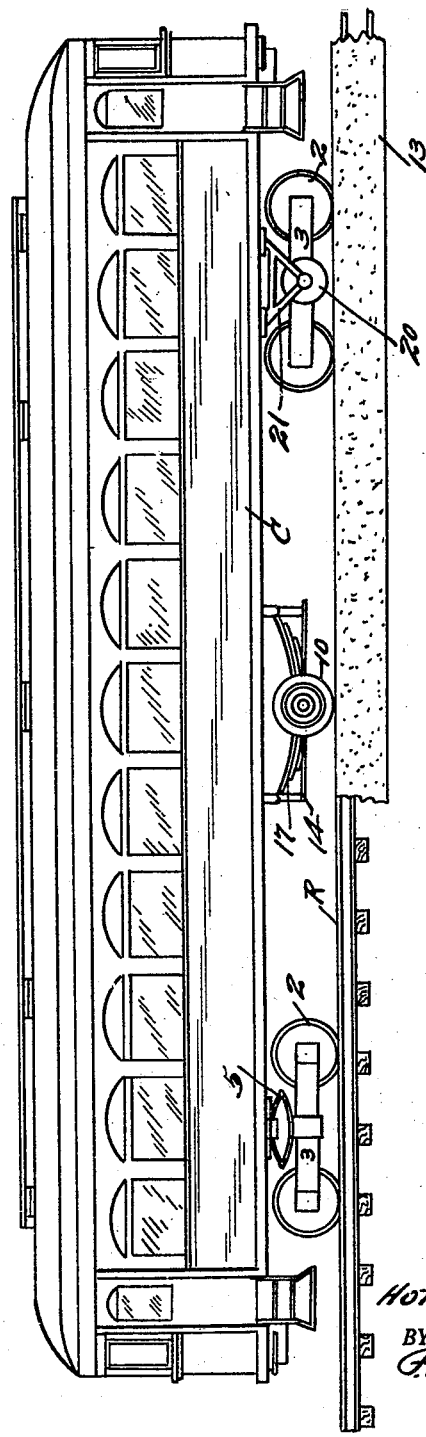
Figure 1 is a side elevation; some duplicate parts being omitted so as to uncover other parts.

The car C shown may be considered of standard length and in comparison its width will be seen to be much greater than that of the standard coaches now in use. The increase in width substantially trebles the passenger capacity of the widened coach with a not unreasonable increase in weight of the car.

In the introduction of my railway system on established roads the old bed and standard gage tracks will be utilized until economically unrepairable, meanwhile a new duplex monorail track is to be installed in preparation for change from old to new.

The car is mounted on fore and aft trucks each preferably consisting of a quadruple set of wheels 2 in twin pairs on cross-axles 4 of the truck frame which icludes side beams 3. Twin wheels 2 are fixed on their axles 4 and either or both of these may be motor driven in any approved manner; motors M being shown mounted on the trucks. Suitable bed springs 5 are interposed between the car body and the trucks.

The wheels 2 are shown as of the conventional type and they run on standard rails R. On old road beds the wheels 2 may be set at standard gage until the rails are worn out or are replaced, preferably, by very close-gaged rails constituting a monorail in so far lateral stability is considered. In laying the rails the ends of the tracks are staggered so that the joints of one line of rails come opposite the center of the rail sections of the other line, thereby reducing wear and tear of rails and equipment, since the center of one rail carries the load over the joint in the opposite line. The shafts 4 are of a length to allow setting of the wheels 2 initially to broad gage if desired.

To obtain lateral stability of the broad car on the two-track or duplex monorail lateral wheels 10 on independent shafts 11 driven by motors 12, are disposed medially of the length of the car. These wheels engage safety ways 13 in the form of suitable stringers. The wheels 10 are preferably rubber tired as they have quieter contact than metal rims and have only to carry a small part of the load. The shafts 11 are borne in frames 14 whose inner sides are mounted on pivots 15—15 and 16—16, which are parallel to the car axis. The load is transmitted to the wheels 10 by appropriate springs 17 in combination with dash pots 18 on the frames 14. The stringers may be of reinforced concrete.

It will be seen, therefore, that the main truck wheels 2 carry the greater part of the load and that the stabilizer wheels run light and come into heavy duty only when the car unduly tilts.

To increase the factor of safety against possible accidents a set of auxiliary or safety rollers 20 is provided and these are hung in bearings 21 so that the rollers will track on the concrete stringers 12, but are normally adjusted to run clear of the stringers until an emergency causes them to come down to the stringers; there being a pair of the rollers on each side of the car. They are here shown as about opposite to the respective trucks.

The invention claimed is:

1. Railway apparatus including, in combination, a right-of-way having a central, main track means, outer track ways therealong, and a car having central, main load trucks each having twin wheels running on the track means, and stabilizing, side wheels independently pivoted to the car and running on the outer track ways.

2. Railway apparatus including, in combination, a right-of-way having a central, main track means, outer track ways therealong, a car having central, main load trucks each with adjustable twin wheels running on the track means, stabilizing, side wheels independently pivoted to the car and running on the outer ways, and means for driving the independent side wheels.

3. Railway apparatus including, in combination, central track means and outer track ways therealong, and a car having central, main trucks running on the said tracks, stabilizing wheels independently connected to the car and tracking on the said ways, and safety wheels hung on the car in a position to clear the ways and engageable therewith in emergency.

4. Railway apparatus including a broad-body car having fore and aft, axial trucks with elongated axles, wheels adjustable, on the axles, between the sides of the trucks as determined by the gage of the bed tracks, lateral stabilizing wheels medially of the car length, and pivoted, independent frames for the lateral wheels.

5. A railway car including a car body having axially disposed, main load trucks operative on main rails, a set of independent wheeled stabilizer frames whose inner ends are pivotally connected to the car to compensate for sway, and cushion means interposed between the car and the said frames said frames carrying motors for driving their wheels.

HORACE M. DOBBINS.